3,814,746
MANNICH BASE OF TETRACYCLINE AND
POLYPEPTIDES
Augusto De Barbieri, Milan, Italy, assignor to Instituto
Sieroterapico Milanese "Serafino Belfanti" Ente Morale,
Milan, Italy
No Drawing. Filed Dec. 3, 1970, Ser. No. 94,950
Claims priority, application Italy, Aug. 5, 1970,
28,334/70
Int. Cl. C07c 103/52, 103/19
U.S. Cl. 260—112.5         7 Claims

ABSTRACT OF THE DISCLOSURE

Tetracycline derivates of synthetic peptides having m-di(2-chloroethyl)amino-phenyl-L-alanine linked through one or more peptide bonds to one or more specified amino-acids, are effective in the treatment of tumors in man and other animals.

The present invention relates to tetracycline derivates of synthetic peptides endowed with substantial activity in the field of antitumor chemotherapy, and processes for the preparation of same.

Antitumor chemotherapy has been the object of much intensive research all over the world in these last years. It must be recognized that some partial results have been achieved; nevertheless the ideal chemotherapy was not yet discovered. This justifies continued efforts to prepare new compounds endowed with antitumor activity. Considering the well known localization of tetracycline in tumor tissues, moreover the strong antitumor activity of certain synthetic peptides carrying a m-di(2-chloroethyl)amino-phenyl - L - alanine residue, compounds were obtained by condensing tetracycline with an ester of such an anti-tumor peptide, with the aim to achieve a better selectivity of the chemotherapeutic activity.

In accordance with the present invention there have been developed compounds corresponding to the general formula:

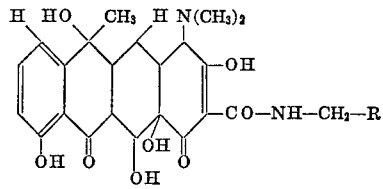

where:

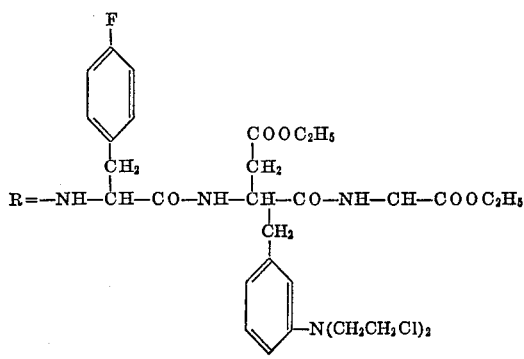

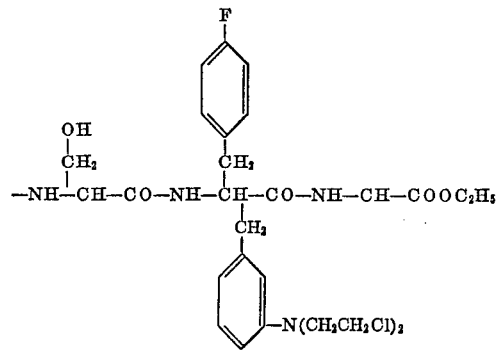

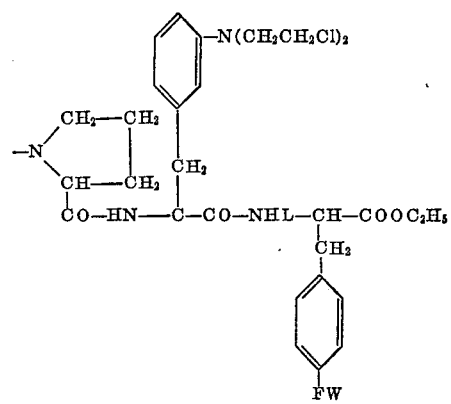

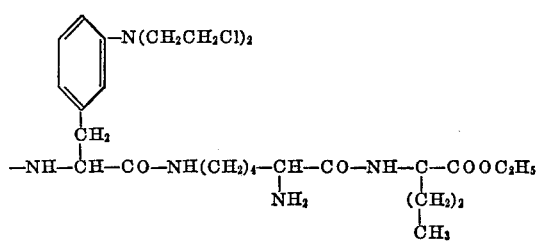

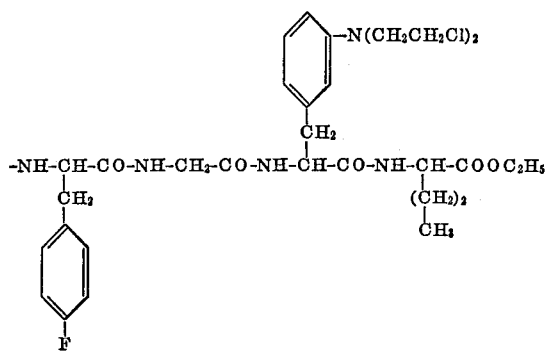

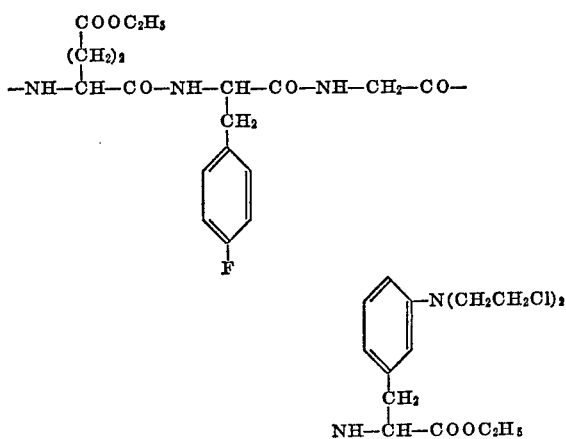

It has been found that mixtures of the compounds falling within the general formula, have a high degree of effectiveness.

The general formula recited above represents one molecule of tetracycline in which the carboxamide function is linked through a methylene group with the free amino-group(s) of an ester (methyl, or ethyl) of a peptide in which at least one amino acid component is a molecule of m-di(2-chloroethyl)amino-phenyl-L-alanine.

The fundamental conditions are the following:

(1) The single amino acid, employed for peptide synthesis and involved in the peptide structure, m-di(2-chloroethyl)amino-phenylalanine included, must belong to the L-configuration, (2) The following, well defined peptide sequences linked through a methylene group to the carboxamide function of tetracycline are established:

(a) p.fluoro-L-phenylalanyl.L-aspartyl.m-di(2-chloroethyl)-amino-phenyl-L-alanine
(b) L-seryl.p.fluoro-L-phenylalanyl.m-di(2-chloroethyl)-amino-phenyl-L-alanine
(c) L-prolyl.m-di(2-chloroethyl)-amino-phenyl-L-alanyl.p.fluoro.L-phenyl-alanine
(d) N,ε[m-di(2-chloroethyl)amino-phenyl-L-alanyl]-L-lysyl.L-norvaline
(e) L-glutamyl.p-fluoro-L-phenylalanyl.glycyl.m-di(2-chloroethyl)amino-phenyl-L-alanine
(f) p.fluoro.L-phenylalanyl.glycyl.m-di(2-chloroethyl)-amino-phenyl-L-alanyl.L-norvaline.

The condensation reaction between tetracycline and an ester of a peptide in stoichiometric proportions was carried out at a suitable temperature and in a convenient medium, ordinarily tert-butyl alcohol in the presence of the proper quantity of formaldehyde. The reaction products were isolated by cooling and further precipitation with a suitable solvent (generally petroleum ether), washed on the filter by the same solvent and dried in vacuo at 50°. The compounds so prepared were submitted to elemental analysis, to spectrophotometric determination of tetracycline and to thin-layer-chromatography with a mixture of butanol-methanol-10% citric acid aqueous solution (4–1–2). Detection: 0.1 N KMnO$_4$.

The peptide portions of the molecule were obtained according to the invention, with the technique employed for the peptide preparation, e.g. by carrying out the condensation between the carboxyl group of one of the component amino acids and the amino-group of another esterified amino acid in the presence of dicyclohexylcarbodiimide. Azide and N-carboxylic anhydride methods were also employed. In order to selectively protect amino functional groups the amino-group itself was acylated with formic acid, or carbobenzoxy chloride and, in some cases, was alkylated with trityl chloride. The carboxyl groups were protected by esterification with methyl, ethyl, hexyl or benzyl esters. Finally, the blocking groups were completely or partially removed by means of catalytic hydrogenolysis, by action of hydrobromic acid in glacial acetic acid or of hydrochloric acid in ethyl alcohol and finally by means of saponification. Elemental analysis of the single compounds was carried out; chlorine atoms linked with covalent and ionic bonds (as hydrochlorides) were separately determined. The purity of the product thus obtained was assayed by thin layer chromatography on silica gel G as well as by the determination of the optical activity.

Various techniques of this invention are better depicted by the following examples. The chemotherapeutic activity of the compounds was evaluated according to the procedures established by CCNSC (Cancer Chemotherapy, National Service Central-U.S. Department of Health, Education and Welfare, Cancer Chemotherapy, Report No. 25, December 1962) employing as tumor test Sarcoma 180 or Adenocarcinoma 755. The only variant was that the determination of tumor weight of mice treated with the substances under test and of the controls was carried out one day after that established by CCNS; this was done in order to allow evaluation of blood white cells during the preceding day, consequently the haemotoxicity was determined. In each experiment, a standard of m-di(2-chloroethyl)-amino - phenyl - L - alanine was used at four level doses in geometrical progression, and also each compound was administered in four doses, corresponding to the content in m-di(2 - chloroethyl) - amino - phenyl-L-alanine contained in the same. Both the standard and the compounds were administered by intraperitoneal injection.

The chemotherapeutic researches indicate that among the many compounds tested by us, those described in the present invention show particularly good results in the pharmacological experimentation and favorable possibilities of therapeutic application in certain cases of human neoplastic disease.

The examples listed below will illustrate the processes of preparation of the six compounds of the present invention, without any limitative character.

EXAMPLE I (NUMBER 158/2)

N-(p-F-L-Phe.(β-OEt)-L-Asp.m-L-SL.OEt)CH$_2$TC 2HCl

Tetracycline-methylene p-fluoro-L-phenylalanyl-(β-ethyl)-L-aspartyl - m - (di-(2-chloroethyl)amino)-L-phenyl-alanine ethyl ester dihydrochloride.

4.45 g. (0.01 mol) of tetracycline were dissolved in 100 ml. of ter-butyl alcohol and treated with 1.8 ml. of a 40% aqueous solution of formaldehyde.

7.15 g. (0.01 mol) of p-fluoro-L-phenylalanyl-(β-ethyl)-L-aspartyl-m(di-(2 - chloroethyl)amino)-L-phenylalanine ethyl ester dihydrochloride were dissolved in 300 ml. of ter-butyl alcohol.

The two solutions were separately heated to the boiling point, then mixed, stirred for about 15 minutes and allowed to cool.

After 24 hours the yellow material separated, was collected by filtration, washed with ter-butyl alcohol and dried in desiccator.

Calcd. (percent): Tc, 37.95; Cl, 12.11. Found (percent): Tc, 40.06; Cl, 14.03.

SYNTHEISIS OF THE PEPTIDE MOIETY COMPOUND 158/2 p - Fluoro - L - phenylalanyl - (β - ethyl) - L - aspartyl-m-(di-(2-chloroethyl)amino)-L-phenylalanine ethyl ester dihydrochloride (VI)

(a) L-aspartic acid β-ethyl ester hydrochloride (I): For the synthesis of (I) see Koch, R. H. Hanson Z. phys. Chem 292 180 (1953).

(b) N-carbobenzoxy-L-aspartic-acid β-ethyl ester (II): 13.8 g. (0.07 mol) of L-aspartic acid ethyl ester hydrochloride, dissolved in 93 ml. of water, were brought to pH 5 with 3 N NaOH (23 ml.) and immediately treated with 5.9 g. (0.07 mol) of sodium bicarbonate.

After solution occurred 5.65 g. (0.14 mol) of magnesium oxide were also added.

After cooling to 0° C. under stirring, the mixture was treated with 23.8 g. (0.14 mol) of carbobenzoxychloride, in small fractions, taking care that the temperature did not exceed 0° C.

The mixture was maintained under stirring for some additional 20 minutes and then filtered. The filtrate was washed with 150 ml. of ethyl ether and then acidified with concentrated HCl to Congo red.

The syrup which separated was extracted twice with ethyl ether: the ether solutions were combined, washed with 50 ml. of water and dried over sodium sulfate.

After ether evaporation an oily residue was obtained which was employed for the synthesis of (III).

(c) N - carbobenzoxy - ($\beta$ - ethyl) - L - aspartyl - m-(di-(2-chloroethyl)amino)-L-phenylalanine ethyl ester (III): To a cooled solution of 13.2 g. (44.6 mmol) of compound (II) and of 14.8 g. (44.6 mmol) of m-(di-(2-chloroethyl)amino)-L-phenylalanine ethyl ester in 160 ml. of chloroform 10.0 g. (48.6 mmol) of dicyclohexylcarbodiimide were added, under stirring and with external ice cooling.

After one night at room temperature, dicyclohexyl urea which precipitated was filtered off: the filtrate was washed twice with diluted acetic acid, with a saturated solution of sodium bicarbonate, then with water.

After drying over sodium sulfate and filtering the solvent was evaporated in vacuo. The residue was crystallized from boiling ethanol, yielding a white crystalline product which was filtered, washed with ethyl ether and dried in the air. Yield: 15 g. $[\alpha]_D^{20}=+45.8°$ (c.=2; chloroform). M.P. 99–101° C.

Calcd. (percent): N, 6.88; Cl, 11.62. Found (percent): N, 6.72; Cl, 11.72.

(d) ($\beta$-Ethyl)-L-aspartyl-m(di-(2-chloroethyl)amino)-L-phenylalanine ethyl ester dihydrochloride (IV): A mixture containing 3.8 g. (6.2 mol) of compound (III), 1 g. of 5% palladized charcoal, 200 ml. of methanol and 10 ml. of glacial acetic acid was catalytically hydrogenated.

After filtering off the catalyst, the filtrate was evaporated in vacuo. The residue taken up with 10 ml. of 5% ethanolic HCl, after dilution with 8–10 volumes of anhydrous ethyl ether, yielded a precipitate which was filtered, washed with ethyl ether, and dried in vacuo over phosphoric anhydride and sodium hydroxide. Yield 2.6 g. $[\alpha]_D^{20}=4.3$ (c.=1; 0.1 N ethanolic hydrochloric acid). M.P. 63° C. (decomposition).

(e) N - formyl - p - fluoro - L - phenylalanyl($\beta$ - ethyl)-L - aspartyl - m - (di - (2 - chloroethyl)amino) - L-phenylalanine ethyl ester (V): 6.7 g. (32.88 mol) of dicyclohexylcarbodiimide were added to a mixture of 14.24 g. (29.89 mmol) of ($\beta$-ethyl)-L-aspartyl-m(di-(2-chloroethyl)-amino)-L-phenylalanine ethyl ester, obtained from its dihydrochloride (compound IV) by treatment with an aqueous solution of sodium carbonate, and 6.3 g. (29.89 mmol) of N-formyl-p-fluoro-L-phenylalanine in 150 ml. of chloroform with external cooling and under electromagnetic stirring.

After about 10 minutes the cooling was interrupted and the solution was maintained at room temperature for 4 hours with continuous stirring.

If the mass set, it was heated on a water bath before filtering and the product, entrained by the precipitated dicyclohexylurea, was extracted with tetrahydrofuran.

The reaction product was obtained by evaporation from the tetrahydrofuran solution and added to the precipitate obtained from the chloroform solution, which was reduced to a half and maintained overnight in a refrigerator (4° C.). The remainder of the chloroform solution was put on a silica gel column (0.05–0.2 mm.) by eluting with chloroform methanol 19:1 and collecting the fractions containing the reaction product, which, after solvent evaporation, was added to the former product thus obtaining on the whole, 14 g. of raw product.

The latter was crystallized twice from absolute ethyl alcohol and washed with alcohol and ethyl ether. Yield 8.2 g. (42%) after drying under I.R. lamp. M.P. 147–49. $[\alpha]_D^{21}=+19.6$ (c.=2; chloroform).

Calcd. (percent): N, 8.37; Cl, 10.59. Found (percent): N, 8.50; Cl, 10.73.

(f) p - Fluoro-L-phenylalanyl($\beta$-ethyl)-L-aspartyl-m-(di-(2-chloroethyl)amino)-L-phenylalanine ethyl ester dihydrochloride (VI): 4 g. (5.97 mmol) of the formyl-derivative, already prepared, were dissolved in a container, sheltered from the room moisture, in 40 ml. of 5% ethanol HCl.

After standing overnight at room temperature the solvent was removed in vacuo, the residue was taken up with 20 ml. of ethanol and evaporated.

The solid residue, dissolved in a reduced amount of ethanol was precipitated by diluting with 10–15 volumes of anhydrous ethyl ether, filtered, washed with ether and dried in vacuo on $P_2O_5$ and NaOH. $[\alpha]_D^{22}=+2.0°$ (c.=2; 1 N ethanol HCl). M.P.=dec. 95° C. Yield: 4.2 g. (100%).

Calcd. (percent): Cl, 9.82, 19.85; N, 7.84. Found (percent): Cl, 9.03, 19.02; N, 7.75.

EXAMPLE II (NUMBER 158/3)

N-(L-Ser.p-F-L-Phe.m-L-SL.Oet).CH$_2$.TC acetate

Tetracycline - methylene.L - seryl.p - fluoro - L - phenylalanyl-m(di - (2 - chloroethyl)amino)-L-phenylalanine ethyl ester acetate 2.2 g. (0.005 mol) of tetracycline were dissolved in 50 ml. of ter-butyl alcohol and treated with 0.5 ml. of a 40% aqueous solution of formaldehyde.

3.2 g. (0.005 mol) of L-seryl-p-fluoro-L-phenylalanyl-m(di-(2-chloroethyl)-amino)-L-phenylalanine ethyl ester acetate were dissolved in 100 ml. of ter-butyl alcohol.

The two solutions were separately heated to the boiling point, then mixed and stirred vigorously for 10 minutes.

The solution was allowed to cool, 300 ml. of petroleum ether were then added by stirring.

A yellow precipitate separated and was collected and washed with petroleum ether. Yield: 2.8 g.

Calcd. (percent): Tc, 40.32; Cl, 6.43. Found (percent): Tc, 47.48; Cl, 7.73.

SYNTHESIS OF THE PEPTIDE MOIETY OF COMPOUND 158/3

L-Seryl-p-fluoro-L-phenylalanyl-m-(di-(2-chloroethyl)-amino)-L-phenylalanine ethyl ester acetate (a) N-formyl-p-fluoro-L-phenylalanyl-m-(di-(2-chloroethyl)-amino)-L-phenylalanine ethyl ester (I): A solution of 46.6 g. (0.14 mol) of m-(di-(2-chloroethyl)-amino)-L-phenylalanine ethyl ester in 300 ml. of tetrahydrofuran was added under stirring and external cooling with 29.6 g. (0.14 mol) of N-formyl-p-fluoro-L-phenylalanine and 31.7 g. (0.15 mol) of dicyclohexylcarbodiimide. After 10 minutes the cooling was interrupted and the stirring was pursued for 3 hours. Dicyclohexylurea which precipitated was filtered off and the filtrate was evaporated in vacuo to dryness.

The residue was washed with ether and crystallized from 300 ml. of 95% alcohol thus obtaining 52 g. of crystallized product flakes, which were washed with ether; M.P. 126–127° C.

The mother liquor and the ether solution of the first washing, after evaporation in vacuo and repeated crystallization of the residue from alcohol, yielded 1.5 g. of product which was equal to the former, with a total yield of 53.5 g. (72.5%). $[\alpha]_D^{22}=+21.7°$ (c.=2; chloroform).

Calcd. (percent): N, 7.98; Cl, 13.47. Found (percent): N, 8; Cl, 13.2.

The purity of the product was controlled employing thin-layer chromatography.

(b) p-Fluoro-L-phenylalanyl-m-(di-(2 - chloroethyl)-amino)-L-phenylalanine ethyl ester hydrochloride (II): 40 g. (76 mmol) of compound (I) were dissolved in 200 ml. of 5% ethanolic HCl, by stirring now and then, and the solution thus obtained was stored in a closed container overnight.

The solvent was eliminated by evaporation in vacuo (40°), the residue was taken up with a small amount of alcohol and evaporated once again.

The gummy residue solidified by dissolving it in 100 ml. of ethyl and gradual dilution with ether (500–1000 ml.).

The precipitate was filtered, washed with ether and dried, first in vacuo on $P_2O_5$, and then in the air under I.R. lamp; M.P. 170–172. Yield 35 g. $[\alpha]_D^{21} = +18°$ (c.=2, ethanol).

Calcd. (percent): N, 7.86; Cl, 19.9, 6.6. Found (percent): N, 7.9; Cl, 19.3, 6.7.

(c) N-carbobenzoxy-L-serine (III): N-carbenzoxy-L-serine was prepared employing Guttman and Boissonas' technique (Helv. Chim. Acta 41, 1852, 1958).

(d) N - carbobenzoxy-L-seryl-p-fluoro-L-phenylalanyl-m-(di-(2-chloroethyl)-amino-L-phenylalanine ethyl ester (IV): A solution of 15.7 g. (29.35 mol) of (II) in 90 ml. of tetrahydrofuran was added with stirring, at room temperature with 3 g. (29.4 mmol) of triethylamine (a precipitate formed), 71.1 g. (29.4 mmol) of (III) and 6.6 g. (32 mmol) of dicyclohexylcarbodiimide followed by 30 ml. of tetrahydrofuran.

After 4 hours the precipitate was filtered off and the filtrate evaporated in vacuo (40° C.).

The half-solid residue was first washed with ether (60 ml.) and crystalized from 100 ml. of ethyl acetate (the cloudy solution was filtered when hot).

The precipitate washed with ethyl acetate and ether weighed 14.2 g. (63.3%); M.P.: 158–160° C. $[\alpha]_D^{21} = +17.9°$ (c.=2; chloroform).

Calcd. (percent): N, 7.79; Cl, 9.85. Found (percent): N, 7.84; Cl, 9.8.

The purity of the product was chromatographycally controlled.

(e) L - seryl-p-fluoro-L-phenylalanyl-m-(di-(2-chloroethyl)-amino)-L-phenylalanine ethyl ester acetate (V): A suspension of 12.3 g. (17.1 mmol) of (IV) and 2 g. of 5% palladized charcoal in a mixture of 250 ml. of methyl alcohol and 25 ml. of acetic acid was hydrogenated while stirring at room temperature.

After cessation of $CO_2$ evolution (after about 1 hour) the hydrogenation was continued for one additional hour: the filtration was carried out removing the catalyst and evaporating the solvent in vacuo (30–40°) to a reduced volume.

By slowly taking up with ether (about 1 volume) under stirring a gelatinous precipitate appeared.

After a careful filtration the washing was carried out with ether, and after an additional filtration the product was dried under I.R. lamp.

Yield: 6.6 g.; M.P. 122–123° C.

By diluting the mother liquor with an additional amount of ether 1.9 g. of product was recovered.

Total yield: 8.5 g. (77.2%).

$[\alpha]_D^{23} = +18.6°$ (c.=2; acetic acid)
$= +4.0°$ (c.=2; methanol)

$CH_2COOH$ percent=9.3 (calcd. 9.3).

Calcd. (percent): N, 8.68; Cl, 11.0. Found (percent): N, 8.64; Cl, 11.3.

The purity of the product was chromatographically controlled.

EXAMPLE III (Number 158/4)

N-(L-Pro.m-L-SL.p-F-L-Phe.Oet).$CH_2$.TCHCl

Tetracycline - methylene.L-prolyl.m-(di - (2 - chloroethyl)amino)-L-phenylalanyl-p-fluoro - L - phenylalanine ethyl ester hydrochloride.

2.8 g. (0.0063 mol) of tetracycline were dissolved in 100 ml. of ter-butyl alcohol and treated with 0.6 ml. of a 40% aqueous solution of formaldehyde.

4 g. (0.0063 mol) of L-prolyl-m-(di-(2-chloroethyl)-amino)-L-phenylalanyl - p - fluoro-L-phenylalanine ethyl ester hydrochloride were dissolved in 300 ml. of ter-butyl alcohol.

The two solutions were separately heated to the boiling point, then mixed and stirred for 10 minutes.

On cooling a yellow precipitate separated and was collected, washed with ter-butyl alcohol and then with anhydrous ethyl ether. Yield: 3 g.

Calcd. (percent): Tc, 40.83; Cl, 9.77. Found (percent): Tc, 42.51; Cl, 9.56.

SYNTHESIS OF THE PEPTIDE MOIETY OF COMPOUND 158/4

L-Prolyl-m-(ci-(2-chloroethyl)-amino)-L-phenylalanyl-p-fluoro-L-phenylalanine ethyl ester hydrochloride (a) N - carbobenzoxy-L-prolyl-m-(di-(2-chloroethyl)-amino)-L-phenylalanine (I): To a chloroform solution (300 ml.) containing 40 g. (0.12 mol) of m-(di-(2-chloroethyl)-amino)-L-phenylalanine ethyl ester were added 29.9 g. (0.12 mol) of N-carbobenzoxy-L-proline (Berger, A. Kurtz, J. E. Katchalski, J.A.C.S. 76 5552 1954), dissolved in 60 ml. of chloroform, followed by 27 g. of dicyclohexylcarbodiimide (0.13 mol). The resulting solution was left at room temperature (about 20° C.) for 3 hours while being stirred.

Dicyclohexylurea (14 g.) formed was removed by filtration and discarded.

The solution was concentrated in vacuo to complete evaporation of the solvent. The resulting oily residue was put on a column containing silica gel C and eluted with a chloroform acetone mixture (9:1).

The purified product, N-carbobenzoxy-L-prolyl-m-(di-(2-chloroethyl)-amino)-L-phenylalanine ethyl ester initially oil-like, solidified after standing undner petroleum ether. Yield 45.9 g.

The product thus obtained was treated in an acetone-aqueous solution with the stoichiometric amount of N NaOH for 1 hour at room temperature and subsequently the NaOH was neutralized with N HCl.

After acetone removal the oily product was extracted with chloroform, the aqueous layer was discarded and the organic layer dehydrated on $Na_2SO_4$.

The solution of the carbobenzoxyderivative was titrated and employed for the synthesis of (II).

(b) L - prolyl-m-(di-(2-chloroethyl)-amino)-L-phenylalanyl-p-fluoro-L-phenylalanine ethyl ester hydrochloride (II): A solution of 23.7 g. (44.2 mmol) of (I) in 130 ml. of chloroform was added with a solution of 9.3 g. (44.2 mmol) of p-fluoro-L-phenylalanine ethyl ester in 200 ml. of chloroform and with 10.3 g. (50 mmol) of dicyclohexylcarbodiimide.

After stirring for 4 hours and standing overnight at room temperature dicyclohexylurea was filtered off.

After drying and taking up with anhydrous ether a solution was obtained: only the last remnants of dicyclohexylurea were left and rapidly filtered.

An abundant precipitate of the tripeptide (17 g.) was obtained from the filtrate.

CARBOBENZOXY REMOVAL 15 g. of N-carbobenzoxy-L-prolyl-m-(di-(2-chloroethyl) - amino)-L-phenylalanyl-p-fluoro-L-phenylalanine ethyl ester were dissolved by heating in 10 volumes of 5% HCl in absolute ethyl alcohol, hydrogenated in the presence of about 2 g. of palladized charcoal to complete $CO_2$ elimination. Palladium was filtered in vacuo: after concentrating to dryness, taking up three times with absolute ethyl alcohol the residue crystallized from alcohol.

Yield: 11.4 g. of tripeptide hydrochloride which decomposes above 95° C. and is chromatographically pure $[\alpha]_D^{20} = -13.86°$ (c.=1; methyl alcohol).

Calcd. (percent): N, 8.86; Cl, 5.61; 16.83. Found (percent): N, 8.9; Cl, 5.62; 16.90.

EXAMPLE IV (NUMBER 158/5)

N,N'-(N(m-L-SL)L-Lys.OEt) (CH$_2$.TC)$_2$.3HCl

Di - tetracycline-dimethylene.N$^\epsilon$(m-di-(2-chloroethyl)-amino) - L - phenylalanyl-L-lysine ethyl ester tetrahydrochloride.

4.4 g. (0.01 mol) of tetracycline were dissolved in 100 ml. of ter-butyl alcohol and treated with 1 ml. of a 40% aqueous solution of formaldehyde.

2.8 g. (0.005 mol) of N$^\epsilon$(m - (di - (2-chloroethyl)-amino)-L-phenylalanyl-L-lysine ethyl ester trihydrochloride were disolved in 100 ml. of ter-butyl alcohol.

The two solutions were separately heated to the boiling point and then mixed by stirring for 10 minutes and allowed to cool.

On cooling a yellow precipitate separated, was collected, washed with ter-butyl alcohol and with anhydrous ethyl ether and dried. Yield: 4.5 g.

Calcd. (percent): Tc, 59.91; Cl, 11.95. Found (percent): Tc, 56.72; Cl, 11.94.

SYNTHESIS OF THE PEPTIDE MOIETY OF COMPOUND 158/5

N-$\epsilon$-(m-(di-2-chloroethyl)-amino)-L-phenylalanyl)-L-lysine ethyl ester trihydrochloride (a) N - $\epsilon$ - (N-carbobenzoxy-m-(di-(2-chloroethyl)-amino) - L-phenylalanyl)-N-$\alpha$-formyl-L-lysine ethyl ester (I): Compound (I) was formed according to the following procedure.

12.4 ml. of tributylamine were added with stirring to a solution of 22 g. of N-carbobenzoxy-m-(di-(2-chloroethyl)-amino)-L-phenylalanine in 200 ml. of chloroform, cooled to 0° C.

Subsequently 6.9 ml. of isobutyl chlorocarbonate were added dropwise; this solution was kept at 0° C. under stirring for 3 hours.

Then 100 ml. of a chloroform solution containing 10.1 g. of N-$\alpha$-formyl-L-lysine ethyl ester (0.05 mol) were added.

After 2 hours at 5° C. the resulting solutions was washed with water, dried on sodium sulfate and evaporated in vacuo to complete elimination of the solvent.

The yield of compound (I) was 20.5 g. [$\alpha$]$_D^{20}$=+12.9 g. (c=2; CHCl$_3$).

(b) N-$\epsilon$-(m-di-(2-chloroethyl)amino)-L-phenylalanyl)-N-$\alpha$-formyl-L-lysine ethyl ester (II): Compound II was formed according to the following procedure. 2 g. of 5% palladized charcoal were added with a suspension of 20.5 g. of compound (I) in 200 ml. of absolute ethyl alcohol.

The resulting suspension was hydrogenated to cessation of CO$_2$ evolution (20 hours).

The solution which was obtained was filtered from paladized charcoal and the solvent removed leaving an oily product (II).

(c) N - $\epsilon$ - (m-(di-(2-chloroethyl)-amino)-L-phenylalanyl)-L-lysine ethyl ester trihydrochloride (III): Compound (III) was formed acording to the following procedure. The oily substance (II) was taken up in 200 ml. ml. of 5% HCl in absolute ethyl alcohol and left at room temperature (about 20° C.) for about 18 hours. After evaporation of the solvent in vacuo the residue was taken up with anhydrous ethyl ether, and the ether was evaporated. Yield: 17.7 g. [$\alpha$]$_D^{20}$=+25° (c=2; N/10 HCl in ethyl alcohol.

Calcd. (percent): N, 9.81; Cl, 18.63; 31.06. Found (percent): N, 9.71; Cl, 18.04, 29.96.

EXAMPLE V (NUMBER 164)

N-[($\alpha$-OEt)-L-Glu-p-F-L-Phe.Gly.m-L-SL.OEt]
CH$_2$.TC.2HCl

Tetracycline - methylene($\alpha$-ethyl)-L-glutamyl-p-fluoro-L - phenylalanyl - glycyl-m-(di-(2-chloroethyl)amino)-L-phenylalanine ethyl ester dihydrochloride.

3.1 g. (0.007 mol) of tetracycline were dissolved in ml. 70 of ter-butyl alcohol and treated with 0.8 ml. of a 40% aqueous solution of formaldehyde.

3.9 g. (0.007 mol) of ($\alpha$-ethyl)-L-glutamyl-p-fluoro-L-phenylalanyl-glycyl - m - (di-(2-chloroethyl)-amino)-L-phenylalanine ethyl ester dihydrochloride were dissolved in 70 ml. of ter-butyl alcohol.

The two solutions were separately heated to the boiling point, then mixed by stirring for 10 minutes and allowed to cool.

On cooling a yellow precipitate separated, was collected, washed with ter-butyl alcohol and with anhydrous ethyl ether and dried. Yield 4.3 g.

Calcd. (percent): Tc, 43.92; Cl, 7. Found (percent): Tc, 45.29; Cl, 7.15.

SYNTHESIS OF THE PEPTIDE MOIETY OF COMPOUND 164

$\gamma$ - Ethyl) - L-glutamyl-p-fluoro-L-phenylalanyl-glycyl-m-(di-(2-chloroethyl)amino)-L-phenylalanine ethyl ester 2.HCl (IV)

(a) Glycyl - m - (di-(2-chloroethyl)amino)-L-phenylalanine ethyl ester (I): 5.15 g. (0.05 mol) of N-formylglycine were suspended in 50 ml. of chloroform. To this suspension 200 ml. of a chloroform solution of m-(dichloroethyl)amino)-L-phenylalanine ethyl ester, containing 16.6 g. (0.05 mol) of substance, were added.

After solution, 10.3 g. (0.05 mol of dicyclohexylcarbodiimide, dissolved in 100 ml. of chloroform, were added to this solution at 10° C. with stirring.

Dicyclohexylurea which separated was filtered off after one night, and the filtrate was concentrated to dryness, the residue crystallized from ethyl alcohol thus obtaining 16 g. of purified product with M.P. 122–124° C. [$\alpha$]$_D^{20}$=+43° (c.=2; chloroform).

FORMYL REMOVAL 13.5 g. (0.032 mol) of N-formylglycyl-h-(di-(2-chloroethyl)amino)-L-phenylalanine ethyl ester were dissolved at room temperature in 250 ml. of 5% HCl in absolute ethyl alcohol.

After one night at room temperature, the solvent was removed in vacuo and the residue was taken up with water and treated with a saturated solution of sodium bicarbonate and extracted with chloroform (200 ml.).

The chloroform solution of the dipeptide (I), thus obtained, after titration, was employed for the synthesis of the tripeptide (II).

(b) p-Fluoro - L - phenylalanyl - glycyl-m-(di-(2-chloroethyl)amino)-L-phenylalanine ethyl ester (II): To a chloroform solution (200 ml.) of 13.5 g. (0.0347 mol) of compound (I), 11.0 g. (0.0347 mol) of N-carbobenzoxy-p-fluoro-L-phenylalanine were added at room temperature.

The solution, thus obtained, was cooled to 5° C. and treated with a solution of 7.8 g. (0.038 mol) of dicyclohexylcarodiimide in 100 ml. of chloroform.

After three hours at room temperature, the dicyclohexylurea which separated was filtered off, the solvent was removed from the filtrate, and the solid residue was crystallized with 250 ml. of methanol, thus obtaining N-carbobenzoxytripeptide; yield 17.5 g.; M.P.: 148–149° C.; [$\alpha$]$_D^{20}$=+26.6° (c.=2; chloroform).

CARBOBENZOXY REMOVAL 20 g. of carbobenzoxy tripeptide were slowly dissolved in 25 ml. of a 40% solution of HBr in glacial acetic acid. After 1 hour the solution thus obtained was poured in 200 ml. of anhydrous ethyl ether. The precipitate (tripeptide hydrobromide) was collected on the filter and washed with ether. The product was treated with a saturated solution of sodium carbonate and chloroform to remove HBr.

The chloroform solution contained the tripeptide ethyl ester (II). After titration of the chloroform solution of the tripeptide, this solution was employed for the synthesis of the tetrapeptide (IV).

(c) N-carbobenzoxy-L-glutaminic acid γ-ethyl ester (III): The N-carbobenzoxy-L-glutaminic acid γ-ethyl ester was prepared according to the Hegedus method (Helv. Chim. Acta 31 737 (1948).

(d) (γ - Ethyl)-L-glutamyl - p - fluoro-L-phenylalanyl-glycyl - m - (di-(2 - chloroethyl)amino)-L-phenylalanine ethyl ester dihydrochloride (IV): To a solution of 22.2 g. (0.040 mol of the tripeptide ethyl ester (Compound II) and 12.3 g. (0.04 mol) of N-carbobenzoxy-L-glutaminic acid γ-ethyl ester (III) in 300 ml. of chloroform was added a solution of 9 g. (0.044 mol) of dicyclohexylcarbodiimide in 200 ml. of chloroform at +5° C.

After standing at room temperature for three hours, dicyclohexylurea separated and was filtered off, while the solvent was removed from the filtrate.

The residue was crystallized from absolute ethyl alcohol, thus obtaining 17 g. of product (carbobenzoxy-derivative) with M.P. 160–162° C. $[\alpha]_D^{20}=-16.3°$ C. (c.=1; methyl alcohol).

Calcd. (percent): N, 8.27; Cl, 8.37. Found (percent): N, 8.28; Cl, 8.40.

CARBOBENZOXY REMOVAL

A mixture of 15 g. (0.017 mol) of N-carbobenzoxy tetrapeptide and 1 g. of palladium black catalyst and 200 ml. of a solution of 0.1 N HCl in methyl alcohol were submitted to hydrogenolysis for 6–7 hours.

After completion of the hydrogenolysis, palladium was recovered by filtration, the filtrate concentrated to a reduced volume and treated with a small amount of ether. Tetrapeptide dihydrochloride (IV) precipitated and was collected on a filter. Yield: 11 g.; M.P.: 100° C. (dec.). $[\alpha]_D^{20}=+7.1°$ (c.=0.9; 0.1 N HCl in ethanol).

Calcd. (percent): N, 8.91; Cl, 18.05, 9.03. Found (percent): N, 8.87; Cl, 18.10, 8.95.

EXAMPLE VI (NUMBER 165)

N-(p-F-L-Phe.Gly.m-L-SL.L-Norval.OEt).CH₂.TC.HCl

Tetracycline-methylene.p-fluoro - L - phenylalanyl.glycyl - m - (di - (2 - chloroethyl)amino)-L-phenylalanyl-L-norvaline ethyl ester hydrochloride.

3.2 g. (0.0072 mol) of tetracycline were disssolved in 200 ml. of ter-butyl alcohol and treated with 0.7 ml. of a 40% aqueous solution of formaldehyde.

5 g. (0.0072 mol) of p-(fluoro-L-phenylalanyl-glycyl.m-(di-(2 - chloroethyl) - amino) - L - phenylalanyl-L-norvaline ethyl ester hydrochloride were dissolved in 100 ml. of ter-butyl alcohol.

The two solutions were separately heated to the boiling point and then mixed by stirring for 10 minutes and allowed to cool.

On cooling a yellow precipitate separated, was collected, washed with ter-butyl alcohol and with anhydrous ethyl ether and dried. Yield: 3 g.

Calcd. (percent): Tc, 38.73; Cl, 9.27. Found (percent): Tc, 42.5; Cl, 8.97.

SYNTHESIS OF THE PEPTIDE MOIETY OF THE COMPOUND 165 p-Fluoro - L - phenylalanyl-glycyl-m-(di-(2-chloroethyl)-amino)-L-phenylalanyl-L-norvaline ethyl ester hydrochloride (F)

N-carbobenzoxy - m - (di - (2 - chloroethyl)amino)-L-phenylalanyl-L-norvaline ethyl ester (A) was formed.

20.6 g. (0.1 mol) of dicyclohexylcarbodiimide in 50 ml. of chloroform were added to a solution containing 14.5 g. (0.1 mol) of +L-norvaline ethyl ester and 43.90 g. (0.1 mol) of N-carbobenzoxy-m-(di-(2-chloroethyl)-amino)-L-phenylalanine in 150 ml. of chloroform at 20° C.

After 3 hours dicyclohexylurea which formed was filtered off and the filtrate evaporated up to complete elimination of the solvent. The residue was taken up with anhydrous ethyl ether and the ether was then evaporated. Yield of (A) 50 g.

CARBOBENZOXY REMOVAL 50 g. of product (A) were treated under stirring with 100 ml. of a saturated hydrobromic acid solution in acetic acid and maintained under stirring for 3 hours at room temperature (about 20° C.). Subsequently the hydrobromide was made insoluble by pouring the solution in anhydrous ethyl ester.

The base was obtained by dissolving the hydrobromide in water, neutralizing it with a saturated solution of sodium bicarbonate, then extracting the base with chloroform (200 ml.). The chloroform solution, titrated with perchloric acid in acetic acid, contained 0.075 mol of dipeptide (B).

N-carbobenzoxy-glycyl-m-(di-(2 - chloroethyl)amino)-L-phenylalanyl-L-norvaline ethyl ester (C) was prepared by the following procedure. 15.5 g. (0.075 mol) of dicyclohexylcarbodiimide in 50 ml. of chloroform were added under stirring, at 20° C. to 200 ml. of a chloroform solution containing 0.075 mol of dipeptide (B) and 15.7 g. (0.075 mol) of N-carbobenzoxyglycine. The resulting reaction lasted for about 3 hours.

After filtering off dicyclohexylurea which had formed and which had separated from the resulting solution, the filtrate was evaporated to complete elimination of the solvent.

The oily product (D) was taken up with anhydrous ethyl ether. The yield was 45 g.

CARBOBENZOXY REMOVAL 40 g. of product (C) were treated with 100 ml. of hydrobromic acid in acetic and maintaned under stirring at room temperature for 3 hours. Subsequently, the hydrobromide was made insoluble by pouring the solution in anhydrous ethyl ether. The base was obtained by dissolving the hydrobromide in water, treating with saturated sodium bicarbonate solution and extracting with chloroform (200 ml.).

The chloroform solution was dried on sodium sulfate and titrated with perchloric acid in acetic acid. It contained 0.05 ml. of tripeptide (D).

N-formyl - p - fluoro-L-phenylalanyl)glycyl-m(di-(2-chloroethyl)amino) - L - phenylalanyl-L-norvaline ethyl ester (E) was then prepared. 10.3 g. (0.05 mol) of dicyclohexylcarbodiimide in 100 ml. of tetrahydrofuran were added, under stirring at room temperature, to a solution containing 0.05 mol of tripeptide (D) and 10.5 g. (0.05 mol) of N-formyl-p-fluoro-L-phenylalanine in 500 ml. of tetrahydrofuran.

The reaction was continued for 4 hours. After filtration and removal of dicyclohexylurea which had formed, the filtrate was evaporated and the residue taken up with anhydrous ethyl ether. The ether was then evaporated. The yield of product (E) was 25 g.

FORMYL REMOVAL 17 g. of compound (E) was dissolved in 250 ml. of 5% HCl in ethyl alcohol and left for 18 hours at room temperature.

The product crystallized spontaneously from the solution. Filtration of the product was carried out by washing. First with a small amount of cold alcohol and then with anhydrous ethyl ether. The yield of product, (F) above, was 15 g.: the product is characterized by $[\alpha]_D^{20}=+39.6$ (c.=1.5; 5% HCl in ethyl alcohol.)

Calcd. (percent): N, 10.13; Cl, 5.13, 15.39. Found (percent): N, 9.92; Cl, 5.13, 14.89.

EXPERIMENTAL TESTS

Chemotherapeutic tests were performed according to the procedure outlined at pages 4 and 5 above. Moreover differences in spectrum of antitumor activity was pointed out in the different compounds by biochemical experiments and in vitro culture tests. For therapeutic purposes it was considered to be convenient instead of employing one single compound, to use a mixture of the aforementioned compounds (number 158/2, 158/3, 158/4, 158/5, 164, 165) in balanced doses in such a way as to have 32 mg. of total m-di(2-chloroethyl)amino)-L-phenyl-alanine in a single dose. The composition of the mixture was: 158/2 mg. 21.2—158/3 mg. 14.5—158/4 mg. 21.4—158/5 mg. 19.5—164 mg. 16.4—165 mg. 30.

Because of the difficulty in predicting the responsiveness of a particular tumor to a definite compound, a preparation composed of several distinct compounds although belonging to the same family, but endowed with different selectivities, increases, by a broadening of the antitumor spectrum, the probability of a favorable therapeutic effect.

Examples of chemotherapeutic researches are reported in the following tables.

where:

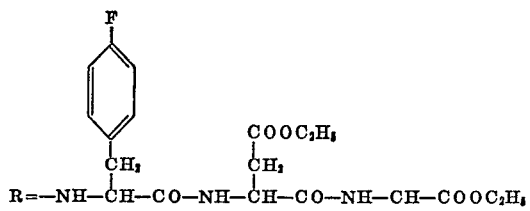

TABLE 1

| Compounds | Doses in mg./kg./wt. | Mortality, dead/total | Percent tumor inhibition | Percent fall in— Carcass | Spleen | Leucocytes |
|---|---|---|---|---|---|---|
| N-(p.FPhe.Asp.m-SL.OEt)-CH₂-TC.2HCl | i.p. 2.8 | 0/6 | 40.79 | 15.19 | 56.76 | |
| Same as above | i.p. 4 | 0/6 | 58.23 | 21.41 | 65.95 | 48.51 |
| Do | i.p. 5.6 | 0/6 | 72.00 | 25.79 | 76.76 | |
| Do | i.p. 7.84 | 1/6 | 80.65 | 23.55 | 78.38 | |
| N-(Pro-m-L-SL.OEt)-CH₂-TC.2HCl | s.c. 2.8 | 0/6 | 0.08 | +7.8 | 34.72 | |
| Same as above | s.c. 5.6 | 0/6 | 51.40 | 4.80 | 64.40 | 40.7 |
| Do | s.c. 7.84 | 0/6 | 69.18 | 13.42 | 79.17 | |
| Do | s.c. 10.98 | 0/6 | 79.20 | 18.70 | 85.65 | |
| Do | or. 2 | 0/6 | 47.91 | +4.7 | 38.76 | |
| Do | or. 2.8 | 0/6 | 61.99 | +2.1 | 55.02 | |
| Do | or. 5.6 | 1/6 | 91.56 | 11.12 | 87.56 | 83.93 |
| Do | or. 7.84 | 0/6 | 92.11 | 26.62 | 88.99 | |
| N-(p.FPhe.Gly.m-SL.OEt)-CH₂-TC | or. 3 | 0/8 | 73.18 | 5.15 | 68.47 | |
| Same as above | or. 9 | 0/8 | 88.67 | 20.21 | 84.78 | 71.81 |
| Do | i.p. 3 | 1/8 | 85.50 | 9.08 | 72.91 | |
| Do | i.p. 9 | 4/8 | 98.74 | 32.10 | 87.68 | 64.65 |
| N-(Phe.Gly.m-SL.Lys.OEt)-CH₂-TC | i.p. 2.8 | 0/8 | 41.68 | 7.58 | 48.44 | 25.23 |
| Same as above | i.p. 5.6 | 4/8 | 81.49 | 24.64 | 81.33 | |
| Do | i.p. 10.98 | 8/8 | | | | |
| N-N'-(Phe.Gly.m-SL.Lys.OEt)-(CH₂-TC)₂ | i.p. 2 | 0/20 | 32.30 | 5.62 | 50.20 | |
| Same as above | i.p. 2.80 | 3/28 | 63.65 | 15.60 | 72.49 | 69.80 |
| Do | i.p. 4 | 0/20 | 78.08 | 20.39 | 80.92 | 70.10 |
| Do | i.p. 5.6 | 10/20 | 85.04 | 21.21 | 86.18 | |
| Do | i.p. 10.98 | 8/8 | | | | |
| N-N'-(Phe.Gly.m-SL.Lys.OEt)-(CH₂-TC)₂·3HCl.2H₂O | s.c. 2.8 | 0/6 | 43.29 | 0.7 | 62.96 | |
| Same as above | s.c. 5.6 | 0/6 | 76.80 | 14.97 | 80.60 | 69.10 |
| Do | s.c. 7.84 | 0/6 | 86.67 | 21.21 | 88.42 | |
| Do | s.c. 10.98 | 2/6 | 94.06 | 26.76 | 92.13 | |
| Do | s.c. 2.8 | 0/12 | 67.41 | 14.69 | 68.59 | |
| Do | s.c. 5.6 | 8/12 | 95.60 | 30.82 | 89.53 | 89.24 |

NOTE.— Antitumor effect of some ethyl esters of tetracycline-methylene-peptides assayed on sarcoma 180. Animals: Mice, 6-8 mice per test groups. Treatment began 24 hours after implant. Doses in geometrical progression. One dose daily for 7 days. Doses expressed in mg. of m-(2-chloroethyl)amino L-phenylalanine contained in the compounds injected. Animals sacrificed on 9th day. Weight of tumors of test animals compared with those of control animals. Results expressed as percentage of diminution of tumor weight in treated animals as compared to control animals. S.c.=subcutaneous injection; i.p.=intraperitoneal; or.=oral treatment.

TABLE 2

Antitumor effect of a *mixture of compounds* 158/2-158/3-158/4-158/5-164-165. Experimental procedure as described before. Composition of the mixture see text (page 33).

| Doses (mg./kg. m-L-SL) | Mortality, dead/total | Percent tumor inhibition | Percent fall in— Carcass | Spleen | Leucocytes |
|---|---|---|---|---|---|
| 2.8 | 0/6 | 46.05 | 10.84 | 52.97 | |
| 4.0 | 0/6 | 77.07 | 15.81 | 77.30 | 63.11 |
| 5.6 | 0/6 | 86.78 | 21.63 | 85.95 | |
| 7.84 | 1/6 | 93.51 | 21.83 | 86.49 | |

What is claimed is:

1. A compound having the formula:

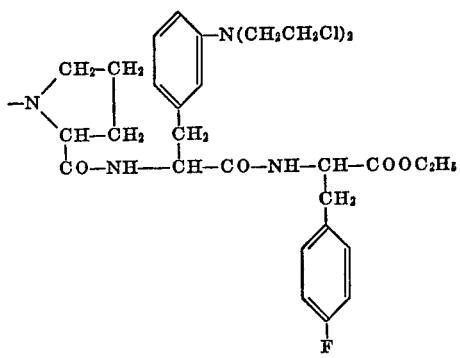

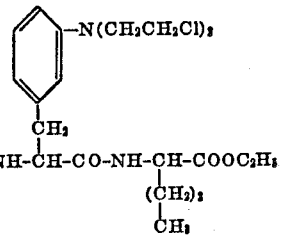

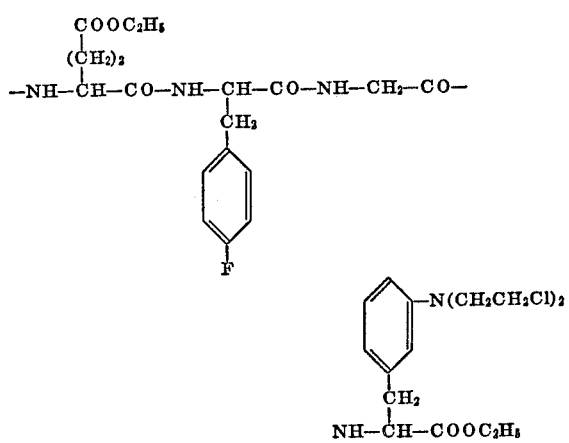

2. A compound as defined in claim 1 having in the peptide moiety the sequence: p.fluoro - L - phenylalanyl-L - aspartyl.m - di(2)chloroethyl)amino-L-phenylalanine ethyl ester.

3. A compound as defined in claim 1 having in the peptide moiety the sequence: L-seryl.p.fluoro - L - phenylalanyl - m[di(2 - chloroethyl)amino] - L - phenylalanine ethyl ester.

4. A compound as defined in claim 1 having in the peptide moiety the sequence: L - prolyl.m - [di(2 - chloroethyl)amino] - L - phenyl-alanyl-p.fluoro.L-phenylalanine ethyl ester.

5. A compound as defined in the claim 1 having in the peptide moiety the sequence: $N_\epsilon${m - di[(2 - chloroethyl)amino] - L - phenylalanyl}L - lysyl.L-norvaline ethyl ester.

6. A compound as defined in claim 1 having in the peptide moiety the sequence: L - glutamyl.p.fluoro.L-phenylalanyl - glycyl.m - [di(2 - chloroethyl)amino]-L-phenylalanine ethyl ester.

7. A compound as defined in the claim 1 having in the peptide moiety the sequence: p.fluoro-L-phenylalanyl.glycyl.m - [di(2 - chloroethyl) - amino] - L - phenylalanyl-L-norvaline ethyl ester.

References Cited

UNITED STATES PATENTS

| | | | |
|---|---|---|---|
| 3,429,869 | 2/1969 | Salat et al. | 260—559 AT |
| 3,637,741 | 1/1972 | Mayama et al. | 260—559 AT |
| 3,272,817 | 9/1966 | Gordon et al. | 260—559 AT |
| 3,637,826 | 1/1972 | Intelisano et al. | 260—559 AT |

FOREIGN PATENTS

| | | | |
|---|---|---|---|
| 4,510M | 10/1966 | France | 260—559 AT |
| 1,042,207 | 9/1966 | Great Britain | 260—559 AT |

LEWIS GOTTS, Primary Examiner

R. J. SUYAT, Assistant Examiner

U.S. Cl. X.R.

260—559 AT; 424—177